US006939469B2

(12) United States Patent
Ohkawa et al.

(10) Patent No.: US 6,939,469 B2
(45) Date of Patent: Sep. 6, 2005

(54) BAND GAP MASS FILTER WITH INDUCED AZIMUTHAL ELECTRIC FIELD

(75) Inventors: Tihiro Ohkawa, La Jolla, CA (US); Robert L. Miller, San Diego, CA (US)

(73) Assignee: Archimedes Operating, LLC, San Diego, CA (US)

( * ) Notice: Subject to any disclaimer, the term of this patent is extended or adjusted under 35 U.S.C. 154(b) by 133 days.

(21) Appl. No.: 10/321,301

(22) Filed: Dec. 16, 2002

(65) Prior Publication Data

US 2004/0112833 A1 Jun. 17, 2004

(51) Int. Cl.$^7$ ............................ B03C 1/00; B01D 21/26

(52) U.S. Cl. ........................ 210/695; 210/746; 210/748; 210/787; 210/143; 210/222; 210/223; 210/512.1; 422/186.01; 209/12.1; 209/727; 204/155; 96/1; 96/2; 96/3; 95/28

(58) Field of Search ................................ 210/695, 748, 210/787, 143, 222, 223, 512.1, 746; 422/186.01; 209/12.1, 727; 204/155; 96/1, 2, 3; 95/28

(56) References Cited

U.S. PATENT DOCUMENTS 3,722,677 A 3/1973 Lehnert
5,422,481 A 6/1995 Louvet
5,681,434 A 10/1997 Eastlund
6,096,220 A 8/2000 Ohkawa
6,203,669 B1 3/2001 Ohkawa
6,214,223 B1 * 4/2001 Ohkawa ..................... 210/222
6,251,281 B1 * 6/2001 Ohkawa ..................... 210/222
6,251,282 B1 * 6/2001 Putvinski et al. ........... 210/222
6,322,706 B1 * 11/2001 Ohkawa ..................... 210/222
6,719,909 B2 * 4/2004 Ohkawa ..................... 210/222
6,730,231 B2 * 5/2004 Putvinski .................... 210/222

* cited by examiner

*Primary Examiner*—David A. Reifsnyder
(74) *Attorney, Agent, or Firm*—Nydegger & Associates

(57) ABSTRACT

A band gap mass filter for separating particles of mass ($M_1$) from particles of mass ($M_2$) in a multi-species plasma includes a chamber defining an axis. Coils around the chamber generate an axially aligned magnetic field defined ($B=B_0+B_1 \sin \omega t$), with an antenna generating the sinusoidal component ($B_1 \sin \omega t$) to induce an azimuthal electric field ($E_\theta$) in the chamber. The resultant crossed electric and magnetic fields place particles $M_2$ on unconfined orbits for collection inside the chamber, and pass the particles $M_1$ through said chamber for separation from the particles $M_2$. Unconfined orbits for particles $M_2$ are determined according to an α-β plot $$\left(\alpha = \frac{\Omega_0^2 + \Omega_1^2/2}{4\omega^2}, \text{ and } \beta = \frac{\Omega_0\Omega_1}{8\omega^2}\right),$$

where $\Omega_0$ is the cyclotron frequency for particles with mass/charge ratio M, and wherein $\Omega_0=B_0/M$ and $\Omega_1=B_1/M$.

17 Claims, 1 Drawing Sheet

BAND GAP MASS FILTER WITH INDUCED AZIMUTHAL ELECTRIC FIELD

FIELD OF THE INVENTION

The present invention pertains generally to devices and methods for processing multi-species plasmas. More particularly, the present invention pertains to devices and methods for controlling the orbits of selected charged particles in a plasma by manipulating crossed electric and magnetic fields ($E_\theta \times B_z$). The present invention is particularly, but not exclusively, useful for tuning the sinusoidal component of a magnetic field ($B_z = B_0 + B_1 \sin \omega t$) to generate an azimuthal electric field ($E_\theta$); to control the orbits of particles having a selected mass/charge ratio; and to thereby separate these particles from a multi-species plasma in a predictable way.

BACKGROUND OF THE INVENTION

Heretofore, several devices and methods have been proposed that act on charged particles (ions) in a multi-species plasma for the purpose of separating particles of different mass/charge ratios from each other. In particular, these devices have been designed and engineered to use crossed electric and magnetic fields to effect charged particles in a plasma. For example, U.S. Pat. No. 6,096,220 which issued to Ohkawa for an invention entitled "Plasma Mass Filter" and which is assigned to the same assignee as the present invention, discloses a device and method for separating charged particles of a multi-species plasma in a plasma chamber. In accordance with this invention, an axially oriented magnetic field is crossed with a radially oriented electric field in a manner that causes particles having mass/charge ratios above a predetermined cut-off mass ($M_c$) to follow unconfined orbits. Consequently, these particles are collected inside the filter chamber. On the other hand, particles having mass/charge ratios below the predetermined cut-off mass ($M_c$) are confined on orbits that cause them to exit the chamber for collection. A variation of the above-mentioned invention disclosed in U.S. Pat. No. 6,719,909, which was issued to Ohkawa on Apr. 13, 2004, for an invention entitled "Band Gap Plasma Mass Filter," and which is also assigned to the same assignee as the present invention, employs a device and method for tuning the radial electric field with a sinusoidal component. This tuning then causes the crossed electric and magnetic fields to target particles of a predetermined mass/charge ratio for confinement in the filter chamber, rather than relying on a demarcation above and below a cut-off mass. As indicated, in these examples, the respective magnetic fields are axially aligned and the respective electric fields are radially oriented. Further, the radial electric fields of these inventions are generated by electrodes.

Depending on the particular application, it is well known that when electrodes are used to generate electric fields, the electrodes can adversely affect their environment if they are not properly controlled. In this respect, plasma mass filters that employ electrodes to generate radial electric fields are no exception. The import here is that the physics and engineering issues implicated in such applications need to be considered. On the other hand, if electrodes are not used to generate an electric field and, instead, the electric field can be induced by other means, the adverse issues alluded to above are generally obviated.

In accordance with basic physics, it is well known that a moving magnetic field can be used to induce an electric field. With this in mind, and by using appropriate assumptions for conditions inside the chamber of a plasma mass filter, it can be mathematically shown that the sinusoidal component of an axially oriented magnetic field will induce an azimuthal electric field $E_\theta$. For this purpose, the magnetic field can be generally defined by the expression $B_z = B_0 + B_1 \sin \omega t$. Further, when a plasma filter is operating near the Alfven cavity mode, or when there is a low plasma density in the filter chamber, additional appropriate assumptions allow an α-β plot (α is abscissa and β is ordinate) to be mathematically established. Specifically, such an α-β plot can be used to determine the operational parameters that will define whether a charged particle, having a selected mass/charge ratio (M), will travel on a confined or and unconfined orbit in the separation section of the plasma chamber. For the α-β plot, $$\alpha = \frac{\Omega_0^2 + \Omega_1^2/2}{4\omega^2}, \text{ and } \beta = \frac{\Omega_0 \Omega_1}{8\omega^2},$$

where $\Omega_0$ is the cyclotron frequency for particles with mass/charge ratio M, and wherein $\Omega_0 = B_0/M$ and $\Omega_1 = B_1/M$.

In light of the above, it is an object of the present invention to provide a band gap mass filter using an azimuthal electric field ($E_\theta$) to separate particles of mass ($M_1$) from particles of mass ($M_2$) in a multi-species plasma which effectively confines the electric field inside the separation section of the filter. Another object of the present invention is to provide a band gap mass filter that effectively obviates the adverse effects that would otherwise result if electrodes were used to generate the electric field. Still another object of the present invention is to minimize the in-vessel components of a band gap mass filter. Yet another object of the present invention is to provide a band gap mass filter that is relatively easy to manufacture, is simple to use and is relatively cost effective.

SUMMARY OF THE INVENTION

In accordance with the present invention, a band gap mass filter includes a chamber with a separation section for processing a multi-species plasma. The filter also includes a plurality of direct current (d.c.) coils that are mounted around the chamber to generate an axially oriented and substantially constant uniform magnetic field ($B_0$) in the filter chamber. Additionally, the band gap mass filter of the present invention includes an r-f antenna that is mounted on the filter to generate a sinusoidal component for the axially oriented magnetic field, ($B_1 \sin \omega t$). Accordingly, the magnetic field in the plasma chamber has a constant component and an r-f (sinusoidal) component that together can be generally defined as $B_z = B_0 + B_1 \sin \omega t$. Specifically, the purpose of the sinusoidal (r-f) component is to induce an azimuthal electric field ($E_\theta$) in the plasma chamber of the filter. On the other hand, the general purpose of the constant component is to maintain the multi-species plasma in the chamber. Importantly, the electric field is crossed with the magnetic field ($E_\theta \times B_z$) to affect charged particles in the separation chamber in a known and predictable manner.

Although no in-vessel components are required to generate the electric field, $E_\theta$, axial currents are, nevertheless, generated inside the separation section of the plasma chamber. Specifically, these axial currents are due to the divergence of the radial ion current as particles are separated inside the chamber. Consequently, to account for this phenomenon, conductors can be placed at opposite ends of the plasma chamber to absorb the axial currents.

For its operation, the band gap mass filter of the present invention includes a unit that controls the magnitude ($B_1$) and the frequency ($\omega$) of the r-f magnetic field. In turn this controlled r-f magnetic field induces the azimuthal electric field ($E_\theta$). The resultant crossed electric and magnetic fields ($E_\theta \times B_z$) place particles of a selected mass/charge ratio, $M_1$, on unconfined orbits inside the chamber. At the same time, the crossed electric and magnetic fields ($E_\theta \times B_z$) allow particles of other mass/charge ratios (e.g. $M_2$) to go on confined orbits inside the chamber. The result is that the particles $M_2$ pass through the chamber on their confined orbits. Thus, they are separated from the particles $M_1$ that are on unconfined orbits and that, therefore, collide with the chamber wall for collection inside the chamber.

In accordance with the present invention, the determination as to whether a particular particle is to be confined or unconfined in the plasma filter chamber is determined by operational parameters selected for the particle according to an α-β plot (α is abscissa and β is ordinate). Specifically, for this plot:

$$\alpha = \frac{\Omega_0^2 + \Omega_1^2/2}{4\omega^2}, \text{ and } \beta = \frac{\Omega_0\Omega_1}{8\omega^2}$$

where $\Omega_0$ is the cyclotron frequency for particles with mass/charge ratio M, and wherein $\Omega_0=B_0/M$ and $\Omega_1=B_1/M$. Preferably, in each case, the predetermined frequency, ω, of the selected r-f magnetic field is less than the cyclotron frequency, Ω, of the selected particles $M_{(2 \ldots n)}$.

In the contemplation of the present invention, the multi-species plasma that is to be processed by the band gap mass filter may include a plurality of particles of mass/charge ratios $M_{(2 \ldots n)}$. In this case it may happen that more than one of these particles need to be placed on unconfined orbits for collection inside the chamber. If so, a predetermined frequency (ω) is selected for each respective particle of mass/charge ratio $M_{(2 \ldots n)}$ that is to be collected inside the chamber. Accordingly, the r-f antenna will generate a plurality of r-f magnetic fields in said chamber, with each r-f magnetic field having its own predetermined frequency (ω) for a dedicated particle of mass/charge ratio.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
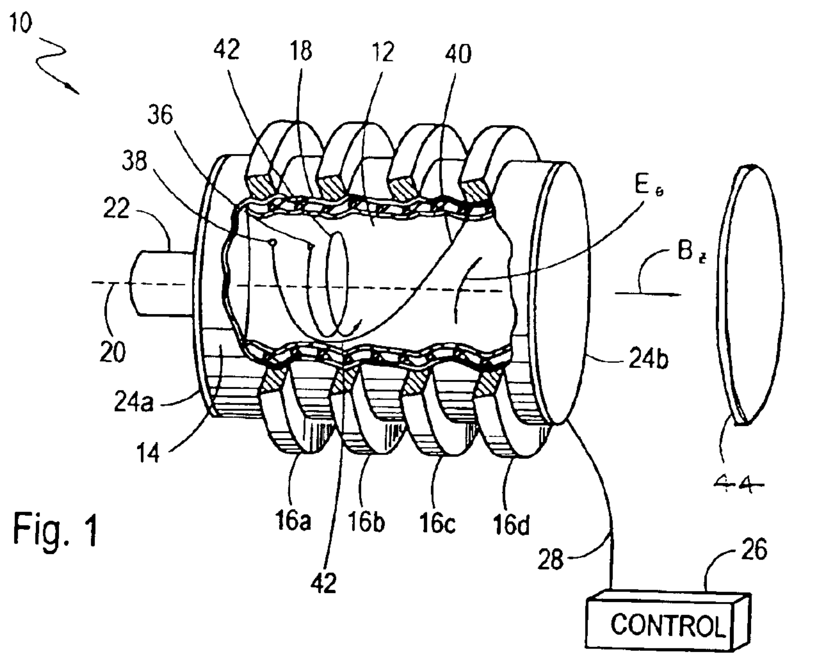
FIG. 1 is a perspective view of a band gap filter in accordance with the present invention.

Referring initially to FIG. 1, a band gap plasma filter in accordance with the present invention is shown and is generally designated 10. As shown, the filter 10 includes a chamber (separation section) 12 that is surrounded by a substantially cylindrical shaped wall 14. Magnetic coils

16*a–d* are shown mounted on the wall 14, as is a radio frequency (r-f) antenna 18. More specifically, both the magnetic coils 16*a–d* and the r-f antenna 18 are positioned on the filter 10 to generate respective constant and sinusoidal magnetic fields that are generally aligned along a longitudinal axis 20 that is defined by the cylindrical shaped wall 14.

Still referring to FIG. 1, it will be seen that the filter 10 includes an injector 22 that is used for introducing a multi-species plasma into the chamber 12. For the purposes of the present invention, the injector 22 can be of any type well known in the pertinent art that is capable of creating a multi-species plasma. Further, the filter 10 is shown to include a conductor 24*a* that is positioned at one end of the chamber 12 and a conductor 24*b* that is positioned at the opposite end of the chamber 12. FIG. 1 also shows that the filter 10 includes a control unit 26 that is electronically connected to the r-f antenna 18 via a line 28.

In the operation of the filter 10, the magnetic coils 16*a–d* are activated to establish a generally constant uniform magnetic field ($B_0$) that is oriented in the chamber 12 substantially parallel to the axis 20. Along with this constant uniform magnetic field ($B_0$), the control unit 26 activates the antenna 18 to generate an r-f (sinusoidal) magnetic field ($B_1 \sin \omega t$) that is also oriented in the chamber 12 substantially parallel to the axis 20. Together, the constant magnetic field and the r-f magnetic field combine to define the magnetic field: $B_z=B_0+B_1 \sin \omega t$. Further, it is to be appreciated that the control unit 26 will manipulate the r-f sinusoidal magnetic field component by establishing the magnitude ($B_1$) of this component, as well as the sinusoidal frequency (ω) of the component.

When a multi-species plasma is introduced into the chamber 12, the determination as to whether a particular charged particle of mass/charge ratio, $M_{(1 \ldots n)}$ will be collected inside the chamber 12, or will pass through the chamber 12 for collection outside the chamber 12, depends on the establishment of certain operational parameters. Specifically, as contemplated for the present invention, these operational parameters can be determined from an α-β plot such as the one shown in FIG. 2 and generally designated 30. The α-β plot 30 (α is abscissa and β is ordinate) is mathematically determined and is based on values for $$\alpha = \frac{\Omega_0^2 + \Omega_1^2/2}{4\omega^2}, \text{ and } \beta = \frac{\Omega_0\Omega_1}{8\omega^2}.$$

Figure 2:
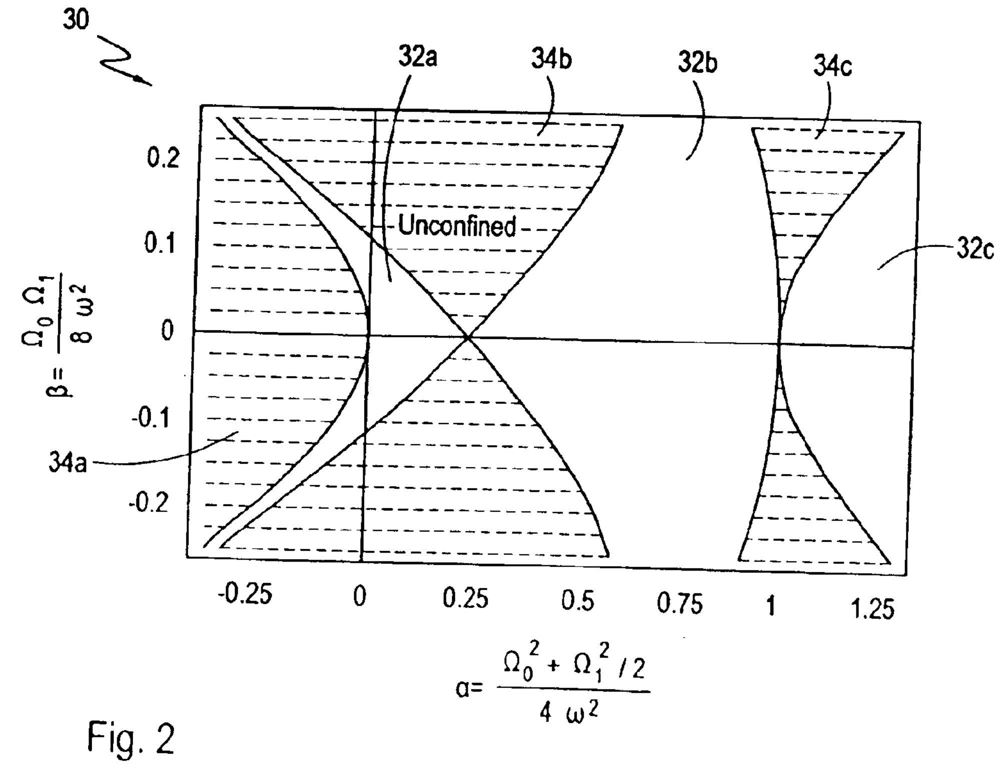
FIG. 2 is a chart showing relationships between variables α and β with regimes (regions) wherein the r-f component of a magnetic field will induce an electric field, and wherein the resulting crossed electric and magnetic fields place selected charged particles on either confined or unconfined orbits while they are in the chamber of the band gap filter.

In these expressions, $\Omega_0$ is the cyclotron frequency for particles with mass/charge ratio M, and $\Omega_0=B_0/M$ and $\Omega_1=B_1/M$. As shown in FIG. 2, the α-β plot 30 for a particular particle will identify regions 32*a–c* corresponding to confined orbits for particles, and regions 34*a–c* corresponding to unconfined orbits for particles. In particular, values for α-β can be determined from a region 32*a–c* that will result in the particle following a confined orbit through the chamber 12. On the other hand, values for α-β determined from a region 34*a–c* will result in the particle following an unconfined orbit inside the chamber 12.

By way of example, consider a multi-species plasma containing both a particle 36 of mass/charge ratio $M_1$, and a particle 38 of different mass/charge ratio $M_2$. When referring to an α-β plot 30 for the particle 38, values for α-β can be selected from one of the regions 34*a–c* that will correspond to specific operational parameters that will place the particle 38 ($M_2$) on an unconfined orbit 40 inside the chamber 12. In particular, these operational parameters will include values for α and β, pertinent to the particle 38, from which the required frequency, ω, for the r-f sinusoidal component of the magnetic field ($B_z$) can be determined. This frequency, ω, as well as the magnitude $B_1$ of the r-f sinusoidal component can then be controlled by the control unit 26 to ensure that the particle 38 ($M_2$) will remain on an unconfined orbit 40. The particle 38 can then be subsequently collected from the wall 14 of the filter 10.

Rather than being unconfined orbits 40 and collected inside the chamber 12, the present invention contemplates placing selected particles on confined orbits 42 inside the chamber 12. Such confined orbits 42 will take the particles out of the chamber 12 for subsequent collection by a collector 44, which is isolated from the electric field ($E_\theta$). Alternatively, particles on confined orbits 42 can be collected at the end of chamber 12 where the conductor **24*b* is located. With this in mind, consider the particle 36 ($M_1$). In this case, values for α-β can be selected from regions 32*a–c* for confined orbits 42. Preferably, unless specifically selected otherwise, it is envisioned by the present invention that values for α-β will be chosen to establish operational parameters which will place particles on confined orbits 42 for transit through the chamber 12**.

While the particular Band Gap Mass Filter with Induced Azimuthal Electric Field as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A band gap mass filter using an azimuthal electric field ($E_\theta$) to separate particles of mass/charge ratio ($M_1$) from particles of mass/charge ratio ($M_2$) in a multi-species plasma which comprises:

a plasma chamber defining an axis;

at least one direct current (d.c.) coil for generating a substantially constant uniform magnetic field ($B_0$) in said chamber to maintain the multi-species plasma in the chamber;

a means for generating an r-f magnetic field in said chamber ($B_1 \sin \omega t$), wherein the r-f magnetic field is oriented substantially parallel to the axis to induce the azimuthal electric field ($E_\theta$) in said chamber; and a means for controlling the magnitude ($B_1$) and the frequency (ω) of the r-f magnetic field to place particles $M_1$ on confined orbits inside said chamber and to place particles $M_2$ on unconfined orbits inside said chamber to pass the particles $M_1$ through said chamber for separation of the particles $M_1$ from the particles $M_2$.

2. A filter as recited in claim 1 wherein said generating means is an r-f antenna.

3. A filter as recited in claim 2 wherein said r-f antenna generates a plurality of r-f magnetic field components in said chamber, with each r-f magnetic field component having a predetermined frequency (ω).

4. A filter as recited in claim 3 wherein said multi-species plasma includes a plurality of particles of mass/charge ratio $M_{(2 \ldots n)}$ to be placed on confined orbits inside said chamber and each predetermined frequency (ω) is selected for a respective particle of mass/charge ratio $M_{(2 \ldots n)}$.

5. A filter as recited in claim 4 wherein the unconfined orbits for respective particles of mass/charge ratio $M_{(2 \ldots n)}$ are selectively determined according to an α-β plot (α is abscissa and β is ordinate) wherein:

$$\alpha = \frac{\Omega_0^2 + \Omega_1^2/2}{4\omega^2}, \text{ and } \beta = \frac{\Omega_0\Omega_1}{8\omega^2};$$

and wherein $\Omega_0$ is the cyclotron frequency for particles with mass/charge ratio M, and wherein $\Omega_0=B_0/M$ and $\Omega_2=B_1/M$.

6. A filter as recited in claim 5, wherein the predetermined frequency, ω, is less than the cyclotron frequency, Ω, of the selected particles of mass/charge ratio $M_{(2 \ldots n)}$.

7. A filter as recited in claim 1 wherein said plasma chamber has a first end and a second end and said filter further comprises:

a first end conductor at said first end; and a second end conductor at said second end, wherein said first and second end conductors are positioned to absorb axial currents in said chamber due to divergence of the radial ion current.

8. A system for separating particles of mass/charge ratio ($M_1$) from particles of mass/charge ratio ($M_2$) in a multi-species plasma which comprises:

a plasma chamber defining an axis;

at least one direct current (d.c.) coil for generating a substantially constant uniform magnetic field ($B_0$) in said chamber wherein the magnetic field is oriented substantially parallel to the axis;

a means for generating an r-f magnetic field in said chamber ($B_1 \sin \omega t$), wherein the r-f magnetic field is oriented substantially parallel to the axis, and wherein the magnitude ($B_1$) and the frequency (ω) of the r-f magnetic field are controlled to induce an electric field in said chamber wherein said electric field is substantially perpendicular to said magnetic field, and further wherein said electric field is confined inside said chamber, and wherein said electric field is crossed with said magnetic field to place particles $M_1$ on confined orbits inside said chamber and to place particles $M_2$ on unconfined orbits inside said chamber to pass the particles $M_1$ through said chamber for separation of the particles $M_1$ from the particles $M_2$;

a source for introducing the multi-species plasma into said chamber wherein said source is isolated from said electric field; and a collector for collecting the particles $M_1$ wherein said collector is isolated from said electric field.

9. A system as recited in claim 8 wherein the magnetic field is defined ($B=B_0+B_1 \sin \omega t$), with $B_0$ being a substantially constant uniform component of the magnetic field in said chamber to maintain the multi-species plasma in the chamber and $B_1 \sin \omega t$ is a sinusoidal r-f magnetic field in said chamber, wherein the r-f magnetic field is oriented substantially parallel to said axis to induce said electric field as an azimuthal electric field ($E_\theta$) in said chamber.

10. A system as recited in claim 9 wherein the r-f magnetic field is generated by an r-f antenna.

11. A system as recited in claim 10 wherein said r-f antenna generates a plurality of r-f magnetic field components in said chamber, with each r-f magnetic field component having a predetermined frequency (ω).

12. A system as recited in claim 11 wherein said multi-species plasma includes a plurality of particles of mass/charge ratio $M_{(2 \ldots n)}$ to be placed on confined orbits inside said chamber and each predetermined frequency (ω) is selected for a respective particle $M_{(2 \ldots n)}$.

13. A system as recited in claim 12 wherein the unconfined orbits for respective particles $M_{(2 \ldots n)}$ are selectively determined according to an α-β plot (α is abscissa and β is ordinate) wherein:

$$\alpha = \frac{\Omega_0^2 + \Omega_1^2/2}{4\omega^2}, \text{ and } \beta = \frac{\Omega_0\Omega_1}{8\omega^2};$$

and wherein $\Omega_0$ is the cyclotron frequency for particles with mass/charge ratio M, and wherein $\Omega_0=B_0/M$ and $\Omega_1=B_1/M$.

14. A method for separating particles or mass/charge ratio ($M_1$) from particles of mass/charge ratio ($M_2$) in a multi-species plasma which comprises the steps of:

providing a plasma chamber defining an axis;

generating a substantially constant uniform magnetic field ($B_0$) and an r-f magnetic field ($B_1$ sin ωt) in said plasma chamber wherein the magnetic fields in said chamber are oriented substantially parallel to the axis;

controlling the magnitude ($B_1$) and the frequency (ω) of said r-f magnetic field ($B_1$ sin ωt) to induce an electric field in said chamber wherein said electric field is substantially perpendicular to said magnetic field, and further wherein said electric field is confined inside said chamber, and wherein said electric field is crossed with said magnetic field to place particles $M_1$ on confined orbits inside said chamber and to place particles $M_2$ on unconfined orbits inside said chamber to pass the particles $M_1$ through said chamber for separation of the particles $M_1$ from the particles $M_2$;

introducing the multi-species plasma into said chamber wherein said source is isolated from said electric field; and collecting the particles $M_1$ wherein said collector is isolated from said electric field.

15. A method as recited in claim 14 wherein the magnetic field is defined ($B=B_0+B_1$ sin ωt), with $B_0$ being a substantially constant uniform component of the magnetic field in said chamber to maintain the multi-species plasma in the chamber and $B_1$ sin ωt is a sinusoidal r-f magnetic field in said chamber, wherein the r-f magnetic field is oriented substantially parallel to said axis to induce said electric field as an azimuthal electric field ($E_\theta$) in said chamber.

16. A method as recited in claim 15 wherein said controlling step generates a plurality of r-f magnetic field components in said chamber, with each r-f magnetic field component having a predetermined frequency (ω), and wherein said multi-species plasma includes a plurality of particles $M_{(2 \ldots n)}$ to be placed on confined orbits inside said chamber and each predetermined frequency (ω) is selected for a respective particle of mass/charge ratio $M_{(2 \ldots n)}$.

17. A method as recited in claim 16 wherein the unconfined orbits for respective particles $M_{(2 \ldots n)}$ are selectively determined according to an α-β plot (α is abscissa and β is ordinate) wherein:

$$\alpha = \frac{\Omega_0^2 + \Omega_1^2/2}{4\omega^2}, \text{ and } \beta = \frac{\Omega_0\Omega_1}{8\omega^2};$$

and wherein $\Omega_0$ is the cyclotron frequency for particles with mass/charge ratio M, and wherein $\Omega_0=B_0/M$ and $\Omega_1=B_1/M$.

* * * * *

UNITED STATES PATENT AND TRADEMARK OFFICE

CERTIFICATE OF CORRECTION

PATENT NO. : 6,939,469 B2

DATED : September 6, 2005

INVENTOR(S) : Ohkawa et al.

It is certified that error appears in the above-identified patent and that said Letters Patent is hereby corrected as shown below:

Column 3,
Line 6, delete "$E_0xB_z$" insert -- $E_\theta xB_z$ --.

Column 6,
Line 7, delete "$\Omega_2=B_1/M$" insert -- $\Omega_1=B_1/M$ --.

Signed and Sealed this

Twenty-second Day of November, 2005

JON W. DUDAS
*Director of the United States Patent and Trademark Office*